US007215317B2

(12) United States Patent
Liou et al.

(10) Patent No.: US 7,215,317 B2
(45) Date of Patent: May 8, 2007

(54) METHOD FOR MODULATING BACKLIGHT SOURCES FOR FLAT PANEL DISPLAYS

(75) Inventors: Chang Ho Liou, Changhua County (TW); Bou Chi Chang, Hsinchu (TW); Chung-Yi Chang, Taichung County (TW); Wei-Jen Chang, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 256 days.

(21) Appl. No.: 11/002,289

(22) Filed: Dec. 3, 2004

(65) Prior Publication Data

US 2006/0056195 A1 Mar. 16, 2006

(30) Foreign Application Priority Data

Sep. 10, 2004 (TW) .............................. 93127378 A

(51) Int. Cl.
*G09G 3/36* (2006.01)
*G02F 1/1335* (2006.01)
*G03B 15/02* (2006.01)

(52) U.S. Cl. ........................ 345/102; 345/82; 345/211; 349/61; 349/68; 362/11

(58) Field of Classification Search .................. 345/82, 345/87, 102; 349/61, 68–70; 362/11
See application file for complete search history.

(56) References Cited

U.S. PATENT DOCUMENTS 6,020,867 A * 2/2000 Shimada et al. .............. 345/87
6,956,556 B2 * 10/2005 Yajima et al. .............. 345/102
2003/0122771 A1 * 7/2003 Sumiyoshi et al. ......... 345/102

* cited by examiner

*Primary Examiner*—Henry N. Tran
(74) *Attorney, Agent, or Firm*—Troxell Law Office, PLLC

(57) ABSTRACT

The present invention provides a method for modulating backlight sources for flat panel displays (FPD), which comprises: lowing steps: step 31: turning on a display screen; step 32: identifying whether the total number of the BLL groups provided on the backlight module is an odd number or an even number; step 33: turning on the one BLL group located at the center-most region of the backlight module while the total number of the BLL groups is an odd number; step 34: turning on the two BLL groups located at the center-most region of the screen while the total number of the BLL groups is an even number; step 35: turning on the two backlight groups located at the two outer side of the center turned-on backlight groups while turning off the center turned-on backlight groups, and similarly, progressing the turning-on and the turning-off from the center region to the two outer edge of the backlight module and then reverse-progressing respectively from the two edges to the center region, so as to complete a full cycle; step 36: determining whether the display screen is off; if so, the process proceeds to step (37); otherwise, the process goes to step (31); and step 37: ending the process.

6 Claims, 7 Drawing Sheets

METHOD FOR MODULATING BACKLIGHT SOURCES FOR FLAT PANEL DISPLAYS

FIELD OF THE INVENTION

The present invention relates to a method for modulating the backlight sources used in a flat panel display, and more particularly, to a method of reducing display nonuniformity by changing the turn on sequence of the backlight module.

BACKGROUND OF THE INVENTION

The appearance and subsequent development of electronic products started only a few decades ago; however, the progressing speed of this industry has surpassed many others. This is especially so in the development of computer related periphery products and video-audio products. New products are ever emerging due to the needs of the working people and recreation needs of the general population. Much progress has been made in these areas; new products are ever emerging. Take the display product for instance; the conventionally used display is constituted of a Cathode Ray Tube (CRT), which usually has the following drawbacks:

1. Since the conventional display is not equipped with flat screen, it is often suffering from a phenomenon of image twisting during watching.
2. The conventional cathode ray tube has comparatively larger power consumption, that is, the cathode ray tube will consume a conceivable more electricity that, as the consequence, the display of cathode ray tube suffers from the phenomena of high temperature and heat.
3. The size reduction of a display system cannot be achieved due to the bulky conventional CRT, causing great inconvenience for utilization of a limited space.

Because of the drawbacks associated with a conventional CRT as indicated above, many display manufacturers have devoted all their efforts to developing displays of the next generation, which include Liquid Crystal Display (LCD), Plasma Panel Display (PPD) and etc. As it stands now, the manufacturing technology of CRT is getting matured; as a result, the cost of a CRT has been reduced to that comparable to a conventional CRT. In addition, the low radio-emission, low power consumption, reduced size and wide view-angle and many other virtues associated with a LCD have made LCD become the favorite display system of the general users.

At present, LCD displays are mostly used in computer monitors, liquid crystal TV sets, and the display systems of 3C electronic products (for example, mobile phones and digital cameras), and the like. It covers a wide variety of applications. Since the liquid crystal is non-luminescent on its own, no direct viewing is possible by human naked eyes. As such, the backlight module has to be included as part of the LCD panel. By virtue of this, clear pictures are made possible if the LCD is provided with a sufficient brightness. However, for the sake of saving the power consumed by a LCD, the backlight sources provided on a backlight module are not supposed to be turned on concurrently. The backlight sources provided on a backlight module associated with a LCD have to be powered-on sequentially, according to the positions of the liquid crystal pixel involved, starting from top to bottom or from bottom to top in the display screen. By doing so, the aims of displaying clear picture and saving of power consumption can thus be achieved. However, the conventional means for lighting up the backlight sources provided on the backlight module of a display system would create a non-uniform brightness on the display screen, that is, the conventional method for lighting up the backlight module would cause non-uniform brightness of the display screen. This problem is due to the time lag existing between power-on of the backlight sources located in the upper potion of the display and power-off of backlight sources located in the lower portion of the display. The duration of time lag, though as short as it may be, can induce enough brightness non-uniformity perceptible to the viewers. As such, doubts about the quality of the display are generated among the consumers at large. The present invention is aimed to solve the problem mentioned above.

SUMMARY OF THE INVENTION

The present invention is motivated by the object to eliminate the drawback of non-uniform brightness associated with the LCD display screen manufactured by the prior art. It is the primary object of the invention to provide a method of reducing display nonuniformity by changing the turn on sequence of the backlight module of a flat panel display, that is, alternately turning on and off the power of the backlight sources provided on a backlight module.

In order to accomplish the object mentioned above, the first embodiment of the present invention provides a method for modulating the backlight source provided on a backlight module, involving alternately turning on and off the backlight sources provided on a backlight module. The method comprises the steps of:

(a1) turning on a display screen;

(a2) identifying whether the total number of the backlight sources provided on the backlight module is an odd number or an even number;

(a3) turning on the one backlight source located at the center-most region of the backlight module while the total number of the backlight sources is an odd number;

(a4) turning on the two backlight sources located at the center-most region of the screen while the total number of the backlight sources is an even number;

(a5) turning on the two backlight sources located at the two outer side of the center turned-on backlight sources while turning off the center turned-on backlight source, and similarly, progressing the turning-on and the turning-off from the center region to the two outer edge of the backlight module and then reverse-progressing respectively from the two edges to the center region, so as to complete a full cycle;

(a6) determining whether the display screen is off; if so, the process proceeds to step (a7); otherwise, the process goes to step (a1); and (a7) ending the process.

In order to achieve the object mentioned above, the second embodiment of the present invention provides a method for modulating the backlight source provided on a backlight module, involving alternately turning on and off the backlight sources provided on a backlight module. The method comprises the steps of:

(a1') turning on a display screen;

(a2) identifying whether the total number of the backlight sources provided on the backlight module is an odd number or an even number;

(a3') turning on the two backlight sources respectively located at the two outermost region of the backlight module and then turning on the two backlight sources respectively located adjacent to the two outermost turned-on backlight sources while turning off the two outermost turned-on backlight sources, and similarly, progressing the turning-on and the turning-off respectively from the two edges toward the center region of the backlight module, and then reverse-progressing from the center region toward the two edges, so as to complete a full cycle;

(a4') turning on the one backlight source located at the center-most region of the backlight module while the total number of backlight sources is an odd number;

(a5') turning on the two backlight sources located at the center-most region of the backlight module while the total number of backlight sources is an even number;

(a6') determining whether the display screen is off; if so, the process proceeds to step (a7'); otherwise, the process goes to step (a1'); and (a7') ending the process.

Summarizing the above, the structure characteristics and the embodiments of the present invention have been disclosed in detail. The present invention has fully demonstrates its novelty and industrial utility. Furthermore, to the best of our knowledge, its usage has never been applied in any products.

DESCRIPTION OF THE PREFERRED EMBODIMENT

The preferred embodiments disclosed according to the invention are elaborated in conjunction with the drawings attached herein. The technical means disclosed in the present invention is principally applied in a liquid crystal display (LCD) and an organic light emitting diode (OLED). The drawings attached hereafter are used for illustration purpose, with the aim to facilitate understanding the technical detail involved. Hence, they are by no means used for excluding any other possible embodiments of the present invention. Lamps are used as the example for the backlight source in the following preferred embodiments of the invention.

Figure 1:
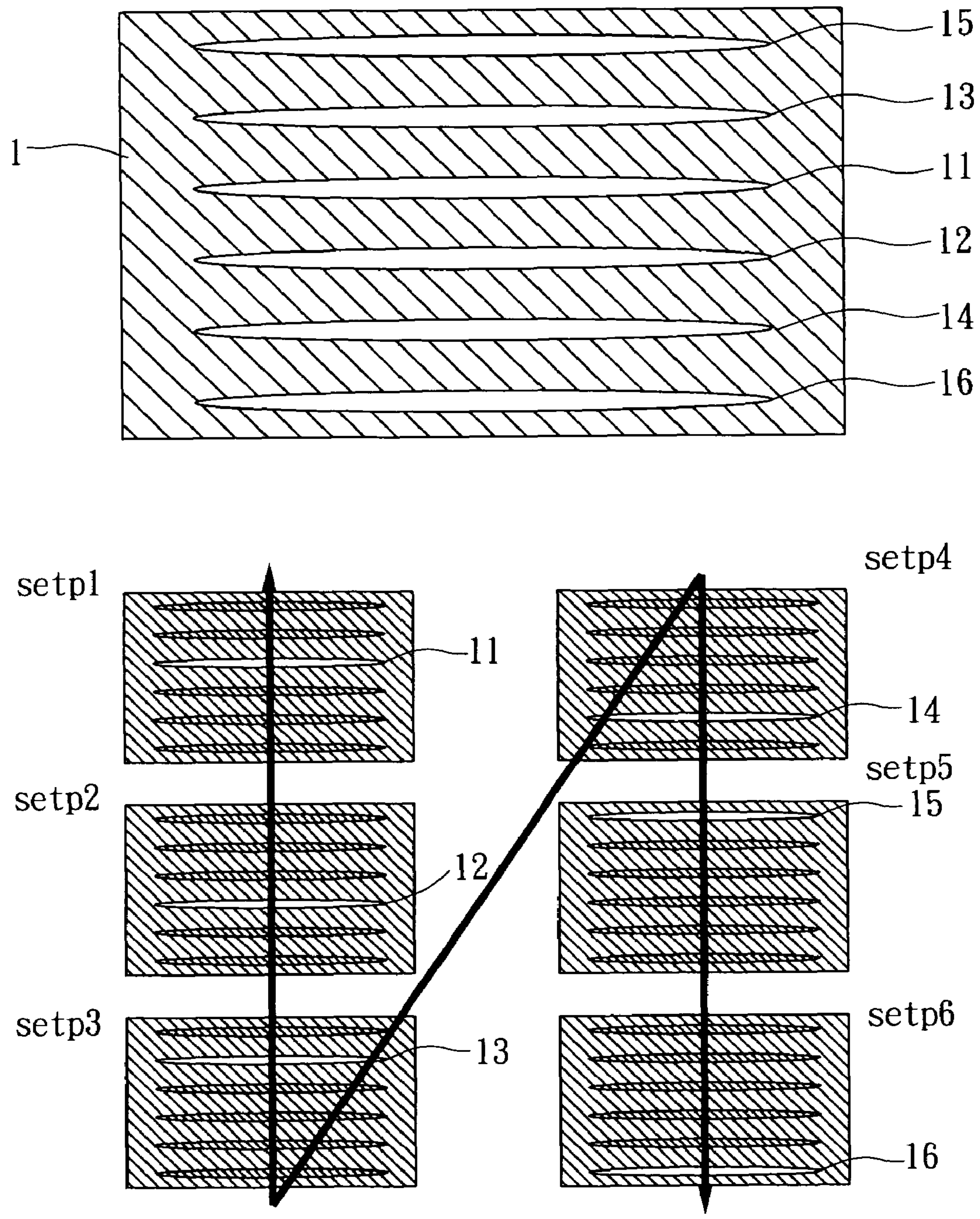
FIG. 1 is the schematic representation showing a turn on sequence of a backlight module according to the first preferred embodiment of the present invention.

FIG. 1 illustrates the sequence for lighting up the lamps of the backlight module, as disclosed in the first preferred embodiment of the present invention, wherein there are an even number of backlight lamp (BLL) groups provided on the display 1. (There are 6 groups of (BLL) in this embodiment of the present invention.) The two BLL groups located at the central area of the display constitute the first set of BLL 11. The first set of BLL 11 is sandwiched by another two BLL groups, which constitute the second BLL set 12. The two BLL groups, which sandwich the second BLL set 12, constitute the third BLL set 13. Through the arrangement of BLL groups shown in FIG. 1, there are two BLL groups in the first BLL set 11, two BLL groups in the second BLL set 12 and two BLL groups in the third BLL group 13. The sequence for lighting up the BLL provided on the Backlight Module is described as follows:

Step 1: turning on the BLL groups of the BLL set 11;

Step 2: turning on the BLL groups of the second BLL set 12 while turning off the BLL groups of the first BLL set 11;

Step 3: turning on the BLL groups of the third BLL set 13 while turning off the BLL groups of the second BLL set 12;

Step 4: turning on the BLL groups of the third BLL set 13 while turning off the BLL groups of the second BLL set 12;

Step 5: turning on the BLL groups of the second BLL set 12 while turning off the BLL groups of third BLL set 13; and Step 6: turning on the BLL groups of the first BLL set 11 a while turning off the BLL groups of the third BLL set 12.

Moreover, it is intended to repeat the cycle from Step 1 to Step 6, if the image on the display 1 is not completely shut down.

Figure 2:
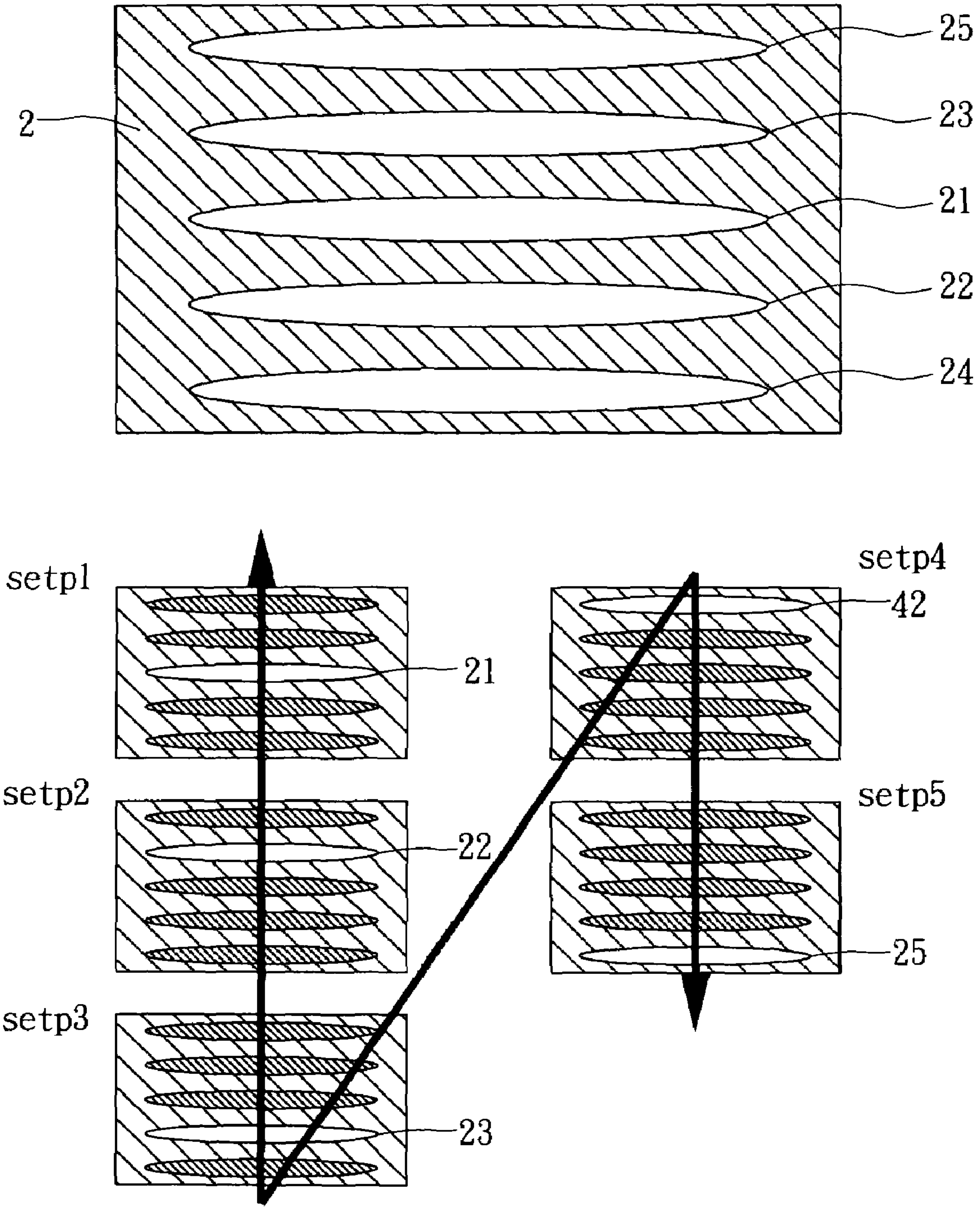
FIG. 2 is the schematic representation showing a turn on sequence of a backlight module according to the second preferred embodiment of the present invention

FIG. 2 illustrates the sequence for lighting up the backlight lamps (BLL) of the backlight module, as disclosed in the second preferred embodiment of the present invention, wherein there are an odd number of the BLL sets provided on the display 2. (There are 5 sets of BLL groups in this embodiment of the present invention.) The BLL group located at the central area of the display constitutes the first BLL set 21. The first BLL set 21 is sandwiched by two BLL groups that constitute the second BLL set 22. The two BLL groups that are set alongside the second BLL set 22 constitute the third BLL set 23. Through configuration of BLL groups described above, there is one BLL group in the first BLL set 21, and thee are two BLL groups in the second BLL set 22 and two BLL groups in the third BLL set 23. The sequence for lighting up the BLL groups is described in the following steps:

Step 1: turning on the first BLL set 21;

Step 2: turning on the second BLL set 22 while turning off the first BLL set 21;

Step 3: turning on the third BLL set 23 while turning off the BLL set 22;

Step 4: turning on the third BLL set 23 while keeping the second BLL set 22 extinguished;

Step 5: turning on the second BLL set 22 while turning off the third BLL set 23;

Step 6: turning on the first BLL set 21 while turning off the second BLL set 22. Moreover, it is intended to repeat the cycle from Step 1 to Step 6, if the image on the display 2 is not completely shut down.

Summarizing what has been disclosed above, the sequence for lighting up the backlight lamps (BLL) provided on a backlight module starts from the central region of the display and progresses toward the outer region, either lighting up or extinguishing the lamps of the backlight module involved, regardless the total number of BLL groups is odd or even. For those who are familiar with the subject technology, the sequence for lighting up or extinguishing the BLL sets of the BLL groups in the display can also be performed starting from the lamp located at the outer region of the display and completed at the central region of the display.

Figure 3:
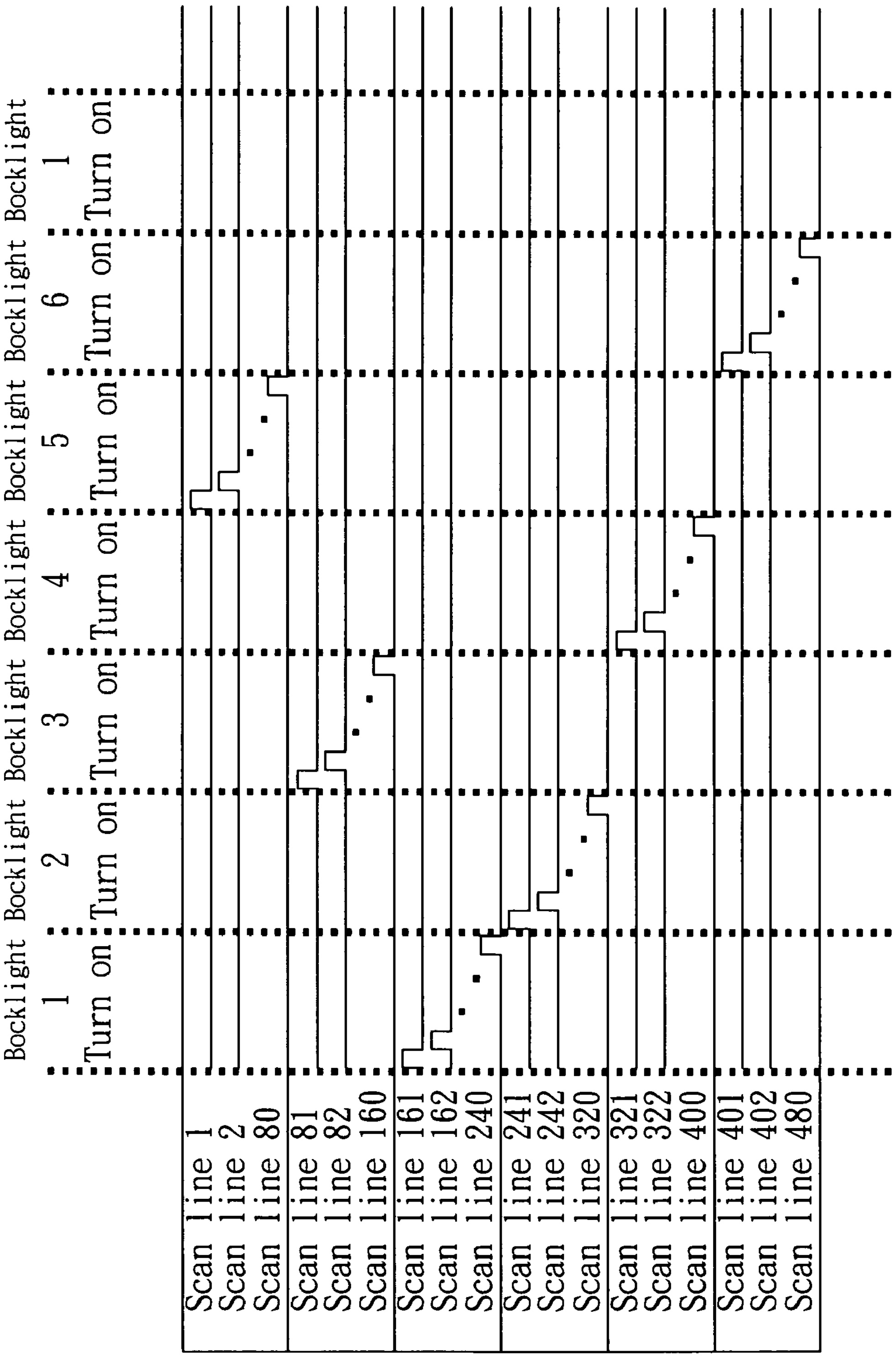
FIG. 3 is the schematic representation showing the scanning lines and the time control scheme according to the present invention.

FIG. 3 illustrates the scanning lines and the time controlling scheme for the BLL groups according to the present invention, wherein the abscissa denotes the turn-on sequence for the BLL set. The turn-on sequence for the BLL shown in this schematic representation follows the order of first BLL set⟹the second BLL set⟹the third BLL set⟹the first BLL set, and repeat the cycle. The ordinate of this schematic representation denotes the position of the scanning lines. In this embodiment, the scanning lines are positioned in sequence from top to down, i.e., starts from the 1st scanning line and goes down to line $480^{th}$. The total number of scanning lines can be divided into 6 equal parts, assuming that the display has 6 BLL sets in the illustration. Hence, each BLL set covers 80 scanning lines. It is known that the two BLL units belonging to the first BLL set covers from line 161 to line 320, the two BLL units belonging to the second BLL set cover from line 81 to line 160 and from line 321 to line 400, respectively. Lastly, the two BLL units belonging to the third BLL set cover from line 1 to line 80 and from line 401 to line 480, respectively. Clear correlation can be established between scanning lines and the BLL units involved by referring to FIG. 1 and FIG. 2.

Figure 4B:
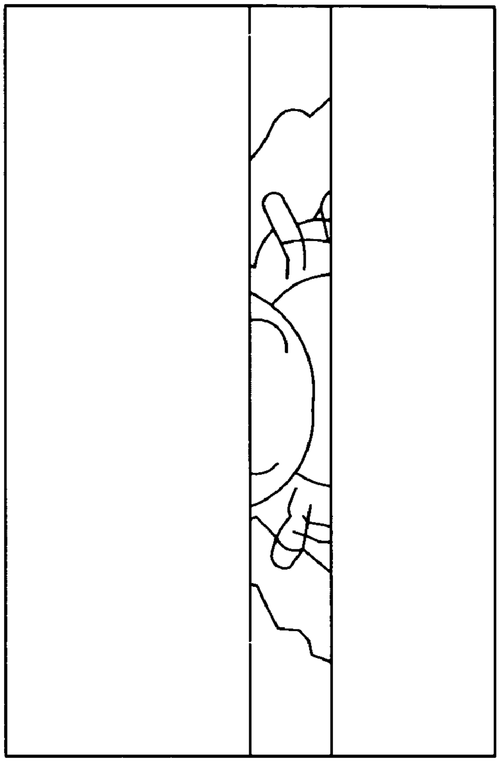
FIG. 4B is the schematic representation showing the display screen after the second backlight source is power-on according to the present invention.
Figure 4A:
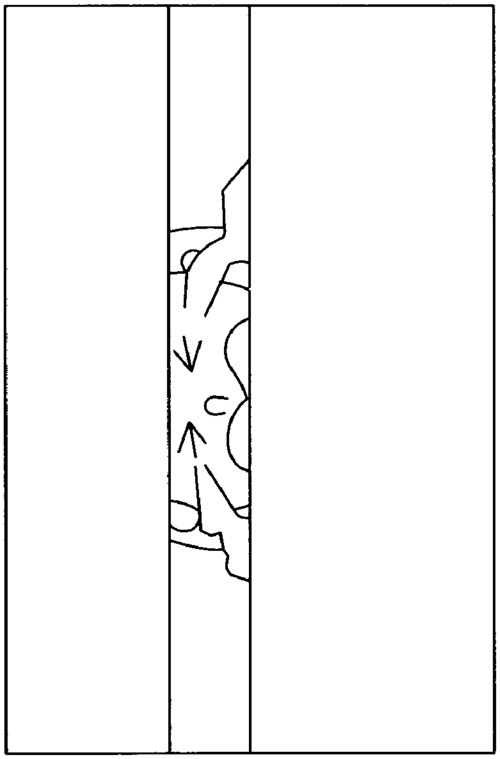
FIG. 4A is the schematic representation showing the display screen after the first backlight source is power-on according to the present invention.

Please refer to FIG. 4A, which is the schematic representation of a display that is displaying an image in the central area of the screen at this moment. This area corresponds to the location where the first set of BLL is located. Notice that this is the moment when only the first set of BLL units is been lighted up; whereas, the second and third sets of BLL units, which are located in other areas is the display are all been extinguished at the moment.

Please refer to FIG. 4B, which is the schematic representation of a display that is displaying images in the two outer areas of the screen at this moment. These areas correspond to locations where the second set of Backlight modules is located. Notice that this is the moment when only the second set of BLL units is been lighted up; whereas, first and third sets of BLL units, which are located in other areas is the display are all been extinguished at the moment.

Figure 4C:
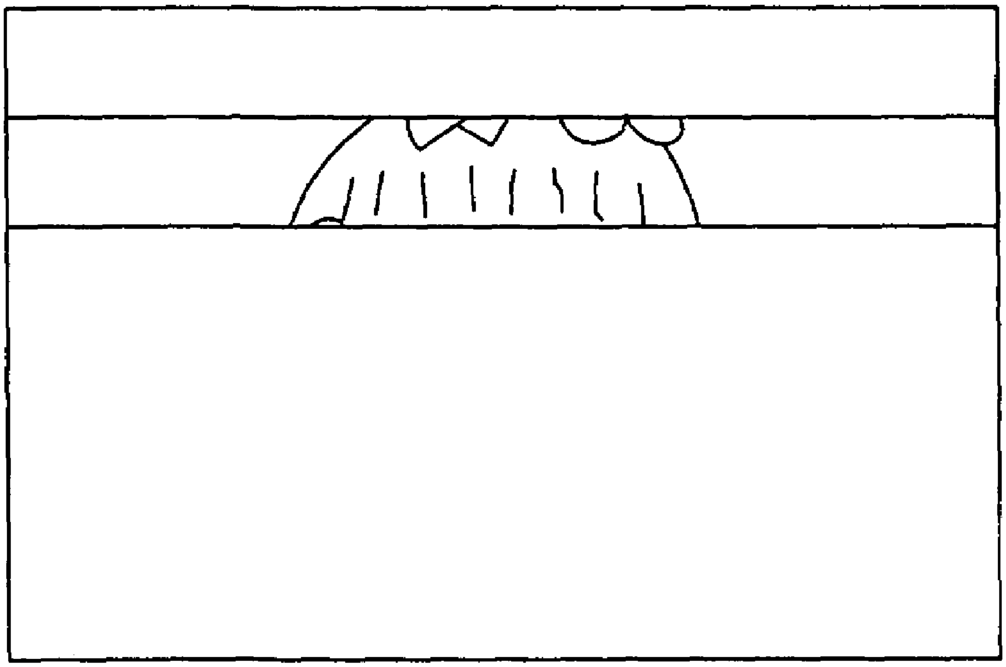
FIG. 4C is the schematic representation showing the display screen after the third backlight source is power-on according to the present invention.

Please refer to FIG. 4C, which is the schematic representation of a display that is displaying images in the two outmost areas of the screen at this moment. These areas correspond to locations where the third set of BLL units is located. Notice that this is the moment when only the third set of BLL units is been lighted up; whereas, the first and third sets of BLL units, which are located in other areas is the display are all been extinguished at the moment.

Figure 5:
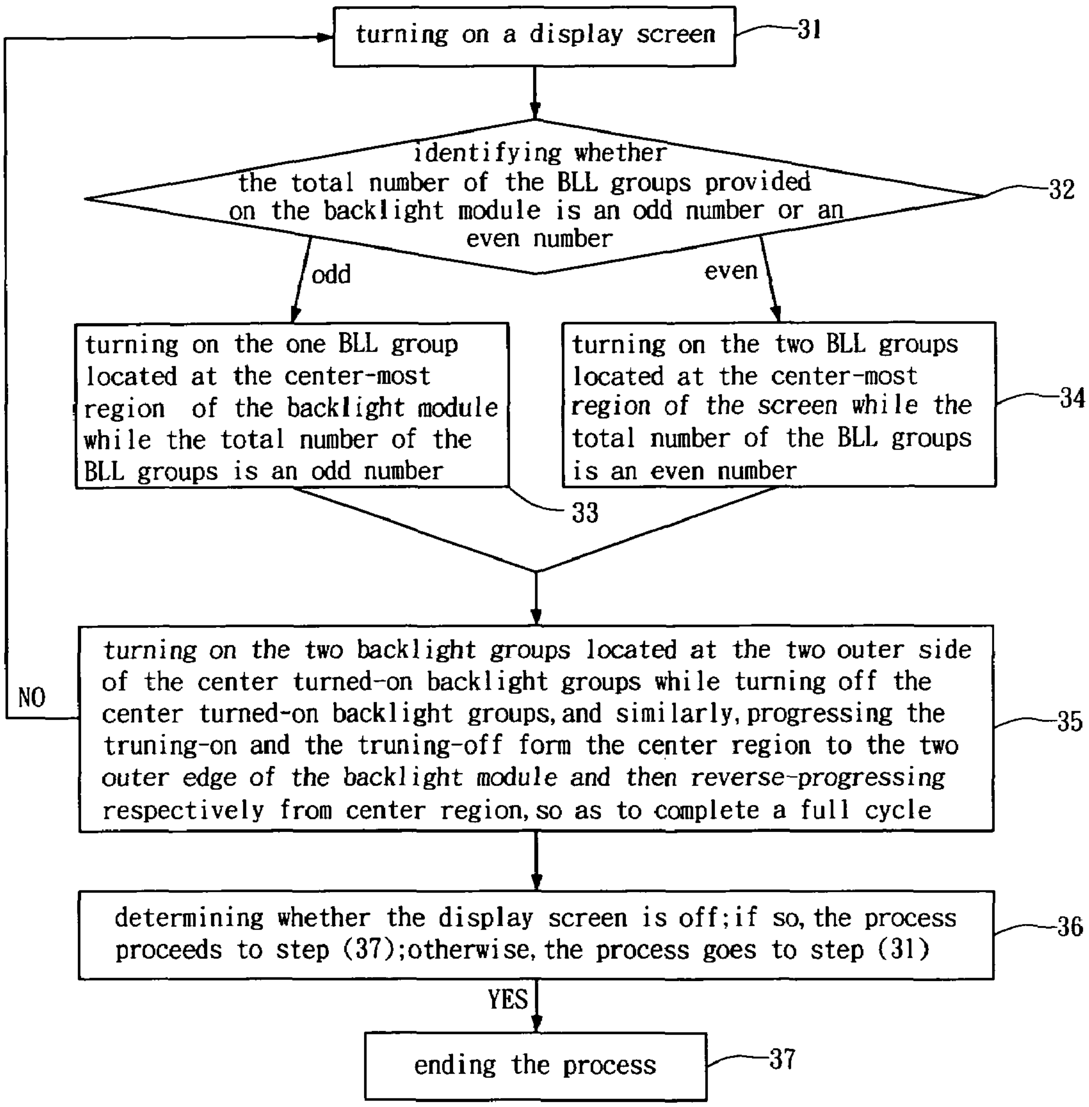
FIG. 5 is a flow depicting the first embodiment of the present invention.

According to what has been disclosed in FIGS. 1 and 2, the flow chart for execution is formulated. Please refer to FIG. 5, which is the first embodiment of the invention that includes series of sequential steps for modulating the power on/off state of the BLL (Backlight Lamps) provided on a display system. FIG. 5 includes the following steps:

Step 31: turning on a display screen;

Step 32: identifying whether the total number of the BLL groups provided on the backlight module is an odd number or an even number;

Step 33: turning on the one BLL group located at the center-most region of the backlight module while the total number of the BLL groups is an odd number;

Step 34: turning on the two BLL groups located at the center-most region of the screen while the total number of the BLL groups is an even number;

Step 35: turning on the two backlight groups located at the two outer side of the center turned-on backlight groups while turning off the center turned-on backlight groups, and similarly, progressing the turning-on and the turning-off from the center region to the two outer edge of the backlight module and then reverse-progressing respectively from the two edges to the center region, so as to complete a full cycle;

Step 36: determining whether the display screen is off; if so, the process proceeds to step (37); otherwise, the process goes to step (31); and;

Step 37: ending the process.

Figure 6:
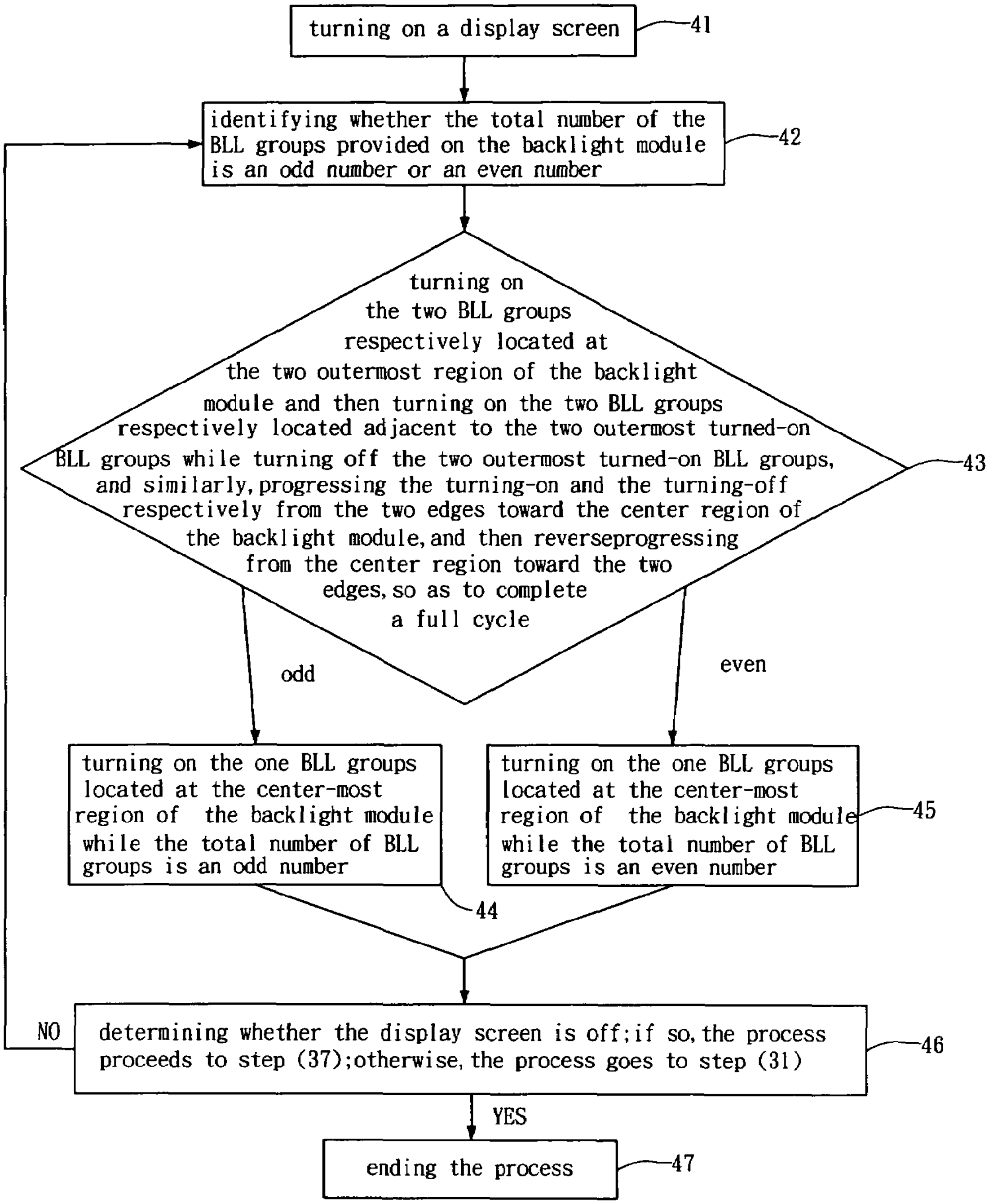
FIG. 6 is the flow depicting the second embodiment of the present invention.

Please refer to FIG. 6, which is the second embodiment of the invention that includes series of sequential execution steps for modulating the power on/off state of the BLL (Backlight Lamps) provided on a display system. FIG. 6 includes the following steps:

Step 41: turning on a display screen;

Step 42: identifying whether the total number of the BLL groups provided on the backlight module is an odd number or an even number;

Step 43: turning on the two BLL groups respectively located at the two outermost region of the backlight module and then turning on the two BLL groups respectively located adjacent to the two outermost turned-on BLL groups while turning off the two outermost turned-on BLL groups, and similarly, progressing the turning-on and the turning-off respectively from the two edges toward the center region of the backlight module, and then reverse-progressing from the center region toward the two edges, so as to complete a full cycle;

Step 44: turning on the one BLL groups located at the center-most region of the backlight module while the total number of BLL groups is an odd number;

Step 45: turning on the two BLL groups located at the center-most region of the backlight module while the total number of BLL groups is an even number;

Step 46: determining whether the display screen is off; if so, the process proceeds to step (47); otherwise, the process goes to step (41); and Step 47: ending the process.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A method for modulating the backlight source (BLS) of a flat panel display, comprising series of execution steps in the sequence set forth:

(a1) turning on a display screen;

(a2) identifying the total number of the BLS groups provided on the backlight module;

(a3) turning on the one BLS group located at the center-most region of the backlight module while the total number of the BLS groups is an odd number;

(a4) turning on the two BLS groups located at the center-most region of the screen while the total number of the BLS groups is an even number;

(a5) turning on the two BLS groups located at the two outer side of the center turned-on BLS groups while turning off the center turned-on BLS group, and similarly, progressing the turning-on and the tu rning-off from the center region to the two outer edge of the backlight module and then reverse-progressing respectively from the two edges to the center region, so as to complete a full cycle;

(a6) determining whether the display screen is off; if so, the process proceeds to step (a7); otherwise, the process goes to step (a1); and (a7) ending the process.

2. The method as recited in claim 1, wherein the flat panel display is a light emitting diode (LED).

3. The method as recited in claim 1, wherein the flat panel display is an organic light emitting diode (OLED).

4. The method as recited in claim 1, wherein the flat pane panel display is a liquid panel display (LCD).

5. A method for modulating the backlight source (BLS) of a flat panel display, comprising series of execution steps in the sequence set forth:

(a1') turning on a display screen;

(a2') identifying the total number of the BLS groups provided on the backlight module;

(a3') turning on the two BLS groups respectively located at the two outermost region of the backlight module and then turning on the two BLS groups respectively located adjacent to the two outermost turned-on BLS groups while turning off the two outermost turned-on BLS groups, and similarly, progressing the turning-on and the turning-off respectively from the two edges toward the center region of the backlight module, and then reverse-progressing from the center region toward the two edges, so as to complete a full cycle;

(a4') turning on the one BLS group located at the center-most region of the backlight module while the total number of BLS groups is an odd number;

(a5') turning on the two BLS groups located at the center-most region of the backlight module while the total number of BLS groups is an even number;

(a6') determining whether the display screen is off; if so, the process proceeds to step (a7); otherwise, the process goes to step (a1'); and (a7') ending the process.

6. The method as recited in claim 5 wherein the flat panel display is an organic light emitting diode (OLED).

* * * * *